United States Patent
Teramoto et al.

(10) Patent No.: US 6,777,068 B2
(45) Date of Patent: Aug. 17, 2004

(54) DOOR WEATHER STRIP

(75) Inventors: Mitsunobu Teramoto, Nishikasugai-gun (JP); Masanori Aritake, Nishikasugai-gun (JP); Hitoshi Omori, Nishikasugai-gun (JP)

(73) Assignee: Toyoda Gosei Co, Ltd., Aichi-ken (JP)

( * ) Notice: Subject to any disclaimer, the term of this patent is extended or adjusted under 35 U.S.C. 154(b) by 113 days.

(21) Appl. No.: 09/769,536

(22) Filed: Jan. 26, 2001

(65) Prior Publication Data

US 2001/0010856 A1 Aug. 2, 2001

(30) Foreign Application Priority Data

Jan. 27, 2000 (JP) .......................................... 2000-018523

(51) Int. Cl.[7] .............................. B32B 3/26; E06B 7/16
(52) U.S. Cl. ................... 428/318.6; 428/318.4; 428/319.3; 428/319.7; 428/319.9; 49/475.1; 49/179.1; 277/921
(58) Field of Search ........................ 428/304.4, 315.5, 428/315.7, 318.6, 319.3, 319.7, 318.4, 319.9; 49/475.1, 495.1, 198.1, 479.1; 277/921

(56) References Cited

U.S. PATENT DOCUMENTS

| | | | |
|---|---|---|---|
| 4,898,760 A | 2/1990 | Halberstadt et al. ......... 428/122 |
| 5,715,632 A | 2/1998 | Nozaki ....................... 49/475.1 |
| 5,728,744 A * | 3/1998 | Okada et al. ................ 521/134 |
| 5,918,421 A | 7/1999 | Nozaki ....................... 49/492.1 |
| 5,992,928 A * | 11/1999 | Kato et al. ............. 296/219.09 |
| 6,221,964 B1 * | 4/2001 | Brzoskowski et al. ...... 525/191 |
| 6,242,502 B1 * | 6/2001 | Brzoskowski et al. ........ 521/92 |
| 6,329,439 B1 * | 12/2001 | Peterson et al. ........... 264/45.5 |
| 6,500,561 B1 * | 12/2002 | Yoshida et al. ............. 428/492 |

FOREIGN PATENT DOCUMENTS

| | | |
|---|---|---|
| EP | 0438874 A2 | 12/1990 |
| EP | 0775727 A1 | 5/1997 |
| EP | 0794226 A1 | 9/1997 |
| GB | 2285946 A | 8/1995 |
| GB | 2334288 A | 2/1999 |
| GB | 2355480 A | 10/1999 |
| JP | 11-348576 * | 12/1999 |

* cited by examiner

Primary Examiner—Terrel Morris
Assistant Examiner—Hai Vo
(74) Attorney, Agent, or Firm—Posz & Bethards, PLC

(57) ABSTRACT

A door weather strip having an extruded member and a molded corner for connecting ends of the extruded member. The extruded member is composed of a foamed thermoplastic olefin elastomer which has an average cell diameter of 30 to 70 μm and an expansion ratio of 150 to 250%.

2 Claims, 1 Drawing Sheet

DOOR WEATHER STRIP

BACKGROUND OF THE INVENTION

1. Field of the Invention

The present invention relates to a door weather strip, and more particularly, to a door weather strip for attachment to a periphery of a door of a motor vehicle.

2. Description of Related Art

A door weather strip is continuously attached to a periphery of a door of a motor vehicle. When the door is closed, a tubular seal portion of the door weather strip contacts and presses a door opening portion of a vehicle body to effect a seal between the door and vehicle body. As illustrated in FIG. 1, a door weather strip W includes an extruded member WA and corner member C1. The corner member C1 is formed by molding to connect longitudinal ends of the extruded member WA, and attached to a right-angled or slightly acute angled corner of a doorframe. Another corner C2 of the door weather strip W has been normally formed by bending an extruded member. If such corner C2 has a great curvature, it has been also formed by molding, similarly to the corner member C1. The extruded member WA of the door weather strip W has been normally composed of a foamed ethylene propylene diene terpolymer rubber (EFDM rubber).

Recently, thermoplastic olefin elastomer (TPO) has been used as glass runs for attachment along an inner periphery of the doorframe, or the like. TPO is advantageous over EPDM rubber, because TPO has a good elasticity and weather resistance approximately equal to those of EPDM rubber, does not require vulcanizing, and enables recycling of scraps thereof.

Foamed TPO has been used as a sealing member. The sealing member of foamed TPO, however, is not so preferable in its appearance and sealing properties, and consequently, has been only used in a limited use such as the sealing member around an engine of a motor vehicle.

The sealing member of foamed TPO has been produced by extruding a material containing TPO as a base, into which water as a foaming agent is mixed, with an extruder. The extruding temperature normally ranges from 140° C. to 250° C. In this extruding temperature range, the water mixed in the material is vaporized, but resultant water vapor is sealed within the material while the material passes a cylinder of the extruder. When the material comes out of an extruder, the pressure which has been applied to the water vapor within the material is reduced, and the water vapor is released to obtain foamed TPO.

The foamed TPO thus obtained, however, has a cell diameter as large as 100 to about 200 $\mu$m, and consequently has rough surfaces. So, the appearance thereof is not suited to the member exposed to external view. In addition, this foamed TPO cannot effect good sealing properties, because of the large cell diameter thereof. When this foamed TPO is curved along the corner C2 or front and rear lower corners of the door panel, it would be undesirably distorted so as not to confirm to these corners of the door. Consequently, this foamed TPO is difficult to use as the door weather strip.

SUMMARY OF THE INVENTION

Accordingly, it is an object of the present invention to provide a door weather strip composed of a foamed TPO, which has excellent sealing properties, presents a good appearance, and is capable of being favorably attached to a vehicle door.

With the door weather strip of the present invention, which is to be attached to the periphery of a vehicle door, the extruded member is composed of a foamed TPO having an average cell diameter of 30 to 70 $\mu$m, and an expansion ratio of 150 to 250%. The door weather strip composed of a foamed TPO of which the average cell diameter and expansion ratio are thus adjusted has smooth surfaces, and exhibits good sealing properties and good work efficiency in attaching.

The foamed TPO for use as the door weather strip is prepared by chemical foaming with a chemical foaming agent.

DETAILED DESCRIPTION OF THE PREFERRED EMBODIMENT

Figure 1:
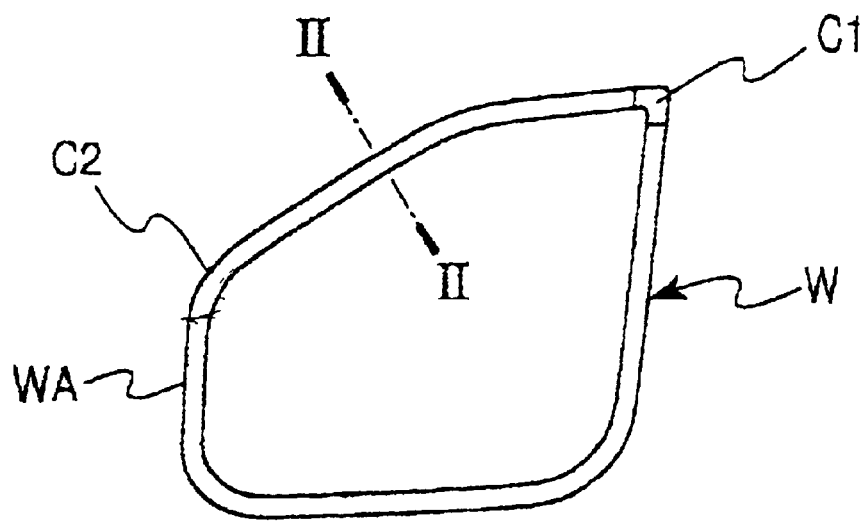
FIG. 1 is a schematic view of an overall door weather strip.

As illustrated in FIG. 1, a door weather strip W includes an extruded member WA and corner member C1 which is molded to connect longitudinal ends of the extruded member WA. The corner member C1 is to be attached to a right-angled corner of a doorframe.

Figure 2:
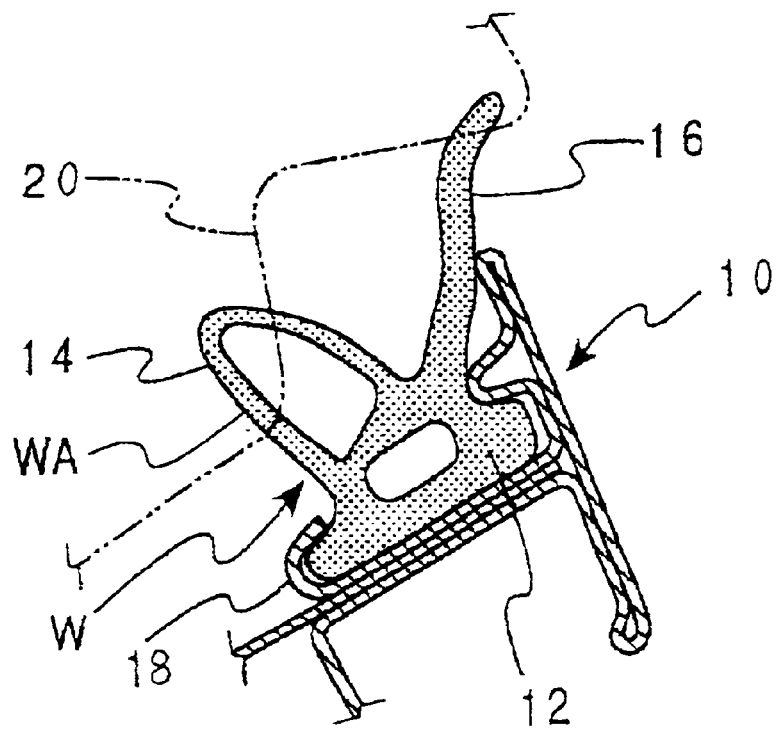
FIG. 2 is a cross-sectional view of a door weather strip which is attached to a vehicle door, taken along the line II—II of FIG. 1.

FIG. 2 illustrates a cross-section of the extruded member WA which is attached to a doorframe 10. As shown, the extruded member WA has a base portion 12, a tubular main seal portion 14 projecting from an inside part of the base portion 12, and a lip-shaped sub-seal portion 16 projecting from an outside part of the base portion 12. The molded corner member C1 has the cross-section substantially identical to that of the extruded member WA. The door weather strip W thus constructed is fitted to a retainer 18 provided along the periphery of the doorframe 10 or secured to the periphery of a door panel (not shown) with clips (not shown).

When a door is closed, the tubular main seal portion 14 and lip-shaped sub-seal portion 16 press a door opening portion 20 of a vehicle body to effect a seal between the door and door opening portion 20.

The extruded member WA is composed of a foamed TPO while the molded corner member C1 is composed of a soft non-foamed TPO. The extruded member WA is obtained by extruding a material containing TPO as a base and a chemical foaming agent at an extrusion temperature of 140 to 230° C. preferably 180 to 200° C.

Examples of the chemical foaming agent include a carbon dioxide gas master batch (trade designation: EV405D, EV505k, manufactured by Eiwa Chemical Ind. Co., Ltd.). By mixing 2 to 5 parts by weight of carbon dioxide gas foaming agent into the material for extrusion, a foamed TPO having an expansion ratio of 150 to 250% and average cell diameter of 30 to 70 $\mu$m is obtained.

The molded corner member C1 is prepared by placing ends of the extruded member WA at ends of a cavity of a mold, which has a cross-section approximately identical to that of the extruded member WA and extends in a generally L-shaped configuration, and injecting a soft TPO material which does not contain any foaming agent into the cavity. The hardness of the molded corner member C1 is adjusted to range from Hs 40° to 50° (JIS A type under JIS K 6301) by varying the composition ratio of resin, rubber, oil or the like within a TPO molding material. When a door is closed, the molded corner member C1 of which the hardness is adjusted to Hs 40°~50° can flex while maintaining a proper pressing force on the door opening portion 20 of a vehicle body.

The extruded member WA of the door weather strip W thus obtained has smooth surfaces and presents a good appearance. When a door is closed, the seal portions 14 and 16 flex and press the door opening portion 20 of the vehicle body with a proper pressing force to ensure excellent sealing properties.

In contrast, in the case of the expansion ratio and average cell diameter being respectively less than 150% and 30 μm, the seal portions 14 and 16 do not flex sufficiently when pressed against the door opening portion 20, and consequently good sealing properties cannot be effected, and the force required for closing the door is increased. On the other hand, in the case of the expansion ratio and average cell diameter being respectively greater than 250% and 70 μm, the seal portions 14 and 16 are less firm so as not to press the door opening portion 20 sufficiently when the door is closed, and consequently the sealing properties thereof are degraded.

The hardness of the foamed material having a rubber-like elasticity cannot be measured with a testing machine which has been normally used for measuring the hardness of the non-foamed material having a rubber-like elasticity. The hardness of the foamed material is expressed by the low deformation tensile stress which is measured by the method prescribed in JIS K 6254 (ISO 7743).

Upon measuring, the low deformation tensile stress of the foamed TPO prepared using the chemical foaming agent was 300 Kpa or less in the expansion ratio of about 200%.

The hardness of the foamed TPO having the low deformation tensile stress of 300 Kpa approximately corresponds to Hs 50° which is the hardness of the soft non-foamed TPO as the material of the molded corner member C1. It is most preferable for the foamed TPO of the extruded member WA to have an average cell diameter of 30 to 70 μm, expansion ratio of 150 to 250% and low deformation tensile stress of 300 Kpa or less.

As described above, by composing the door weather strip of an extruded body of a foamed TPO having an average cell diameter of 30 to 70 μm and expansion ratio of 150 to 250%, cells are distributed finely to give good appearance to the surface of the door weather strip, and improve the flexibility and sealing properties. The door weather strip composed of a foamed TPO can be obtained without any vulcanizing treatment, thereby improving the productivity, and enables recycling of scraps thereof.

In the preceding embodiment, the present invention has been explained with reference to the door weather strip which is provided with a lip-shaped sub-seal portion. The present invention is not limited to such door weather strip. The present invention can be also applied to the door weather strip which is partially provided with a lip-shaped sub-seal portion, and the door weather strip which is not provided with a lip-shaped sub-seal portion.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A door weather strip for attachment to a periphery of a door of a motor vehicle, the door weather strip including a base portion, a tubular main seal portion that projects from an inside part of the base portion, and a lip-shaped sub-seal portion that projects from an outside part of the base portion, the door weather strip comprising:

an extruded member; and a molded part for connecting ends of the extruded member, the extruded member being composed of a foamed thermoplastic olefin elastomer which is prepared by chemical foaming and has an average cell diameter of 30 to 70 μm, an expansion ratio of 150 to 250%, and a low deformation tensile stress of approximately 300 Kpa, and the molded part being composed of a non-foamed thermoplastic olefin elastomer which has a hardness of approximately Hs 50° corresponding to the low deformation tensile stress of approximately 300 Kpa, the extruded member and the molded part having an approximately identical hardness to each other, whereby the door weather strip exhibits approximately uniform flexibility over an entire length thereof.

2. A door weather strip attached to a periphery of a door of a motor vehicle, the door weather strip comprising:

an extruded member that is composed of a foamed thermoplastic olefin elastomer, wherein the foamed thermoplastic olefin elastomer has an average cell diameter of 30 to 70 μm, an expansion ratio of 150 to 250%, and a low deformation tensile stress of approximately 300 Kpa; and a molded part connected to the extruded member, wherein the molded part is composed of a non-foamed thermoplastic olefin elastomer that has a hardness of approximately Hs 50° and a low deformation tensile stress of approximately 300 Kpa, wherein the extruded member and the molded part have approximately the same hardness.

* * * * *